(12) United States Patent
Uribe (10) Patent No.: US 11,415,415 B1
(45) Date of Patent: Aug. 16, 2022

(54) SELF-LEVELING LASER LEVEL (71) Applicant: David Uribe, Fort Lauderdale, FL (US)

(72) Inventor: David Uribe, Fort Lauderdale, FL (US)

( * ) Notice: Subject to any disclaimer, the term of this patent is extended or adjusted under 35 U.S.C. 154(b) by 0 days.

(21) Appl. No.: 17/699,234

(22) Filed: Mar. 21, 2022

Related U.S. Application Data (60) Provisional application No. 63/163,930, filed on Mar. 21, 2021.

(51) Int. Cl.
 *G01C 15/00* (2006.01)
 *G01C 15/10* (2006.01)

(52) U.S. Cl.
 CPC ......... *G01C 15/004* (2013.01); *G01C 15/008* (2013.01); *G01C 15/105* (2013.01)

(58) Field of Classification Search
 None
 See application file for complete search history.

(56) References Cited

U.S. PATENT DOCUMENTS

| | | | | | |
|---|---|---|---|---|---|
| 5,782,003 | A  * | 7/1998  | Bozzo | ................. | G01C 15/004 33/285 |
| 7,134,212 | B2 * | 11/2006 | Marshall | .............. | G01C 15/004 33/291 |
| 7,454,839 | B2 * | 11/2008 | Della Bona | ............ | F16M 11/14 33/291 |
| 7,571,546 | B1 * | 8/2009  | Sergyeyenko | ......... | G01C 15/02 33/291 |
| 7,690,124 | B1 * | 4/2010  | Henry | .................. | G01C 15/004 324/67 |
| 10,119,817 | B2 * | 11/2018 | Spaulding | ............ | G01C 15/004 |
| 10,508,916 | B2 * | 12/2019 | Huang | ..................... | G01C 9/24 |
| 10,598,490 | B2 * | 3/2020  | Yong | ....................... | H01S 5/005 |
| 2003/0231303 | A1 * | 12/2003 | Raskin | ................. | G01C 15/008 356/247 |
| 2005/0155238 | A1 * | 7/2005  | Levine | ................. | G01C 15/004 33/286 |
| 2006/0016084 | A1 * | 1/2006  | Liao | ..................... | G01C 15/002 33/286 |
| 2007/0113412 | A1 * | 5/2007  | Kallabis | ................. | G01C 15/10 33/286 |
| 2012/0090184 | A1 * | 4/2012  | Zimmermann | ...... | G01C 15/004 33/291 |

* cited by examiner

*Primary Examiner* — Christopher W Fulton (57) ABSTRACT

An effective inexpensive, compact and easy-to-use self-leveling laser level capable of projecting at least two laser beams at any desired angle dialed on a 360-degree format.

20 Claims, 5 Drawing Sheets

SELF-LEVELING LASER LEVEL

RELATIONSHIP TO OTHER APPLICATIONS

None

BACKGROUND

Carpenters, brickmasons, construction workers and home do-it yourselfers require the ability to align objects on walls or other vertical surfaces using lasers levels. Currently, there are a number of solutions for laser levels, most of them are only capable of projecting a single light beam on a level line, some can project a plumb line, few are capable of projecting simultaneously two light beams in opposite direction of the axis, even fewer are able to project lines in any angle on the 360 degrees format.

Some of these solutions, especially on the lower price point attempt to use outdated systems, like the spirit, torpedo or bubble level that was invented in 1661, but these solutions fail to meet the needs of the industry because they are not self-leveling and require visual calibration that is subjective and often inaccurate. Other solutions that are self-leveling use an internal pendulum, but these solutions are similarly unable to meet the needs of the industry because these devices use a knife's edge as a pivot axis or use a pin as a pivot point. Unfortunately, sharp knife edges and pin points are fragile and are easily damaged as a result of sharp impact forces. So, this laser levels are fragile, expensive and too large for most tool boxes. Still, other solutions are able to project level lines in multiple planes, but these solutions also fail to meet the industry needs because some of them use multiple lasers, one for each orientation. are even more expensive, fragile and large to be practical for most users. Therefore, there currently exists a need in the industry for a sturdy pocket-sized laser level that is self-leveling, capable of dialing and projecting two opposing bright light beams at any angle quickly and accurately while also saving time and the need of an assistant to measure distances beyond arm's reach.

BRIEF DESCRIPTION OF THE INVENTION

The present invention provides a compact self-leveling laser level capable of projecting laser beams in any angle dialed on a 360-degree format. And if desired a way to accurately measure and mark from the initial point along the light beams beyond arm's reach without the need of an assistant.

DETAILED DESCRIPTION OF THE INVENTION

Disclosed is a compact self-leveling laser level, which is made up of the following components:

1. A case, that consists of a front shell and a rear shell; the front shell contains the ballbearing, with its corresponding brace and extension, and a weight; the rear shell contains a power source, an on/off switch, and the light beams. The case (housing) contains the working components, and has a front shell and a back shell adapted to fit together defining a cavity to contain the working components, wherein both the front shell and the back shell defines a circumference and has an inner surface and an outer surface, and is shaped approximately in the form of a tube, substantially closed at one end by a disc-shaped face, said disc-shaped face having a central hole therein, wherein both the front shell and the back shell each has a diameter and a depth wherein the diameter is larger than the depth.

2. A special screw and its corresponding pin.

These components are connected as follows:

The front shell acts entirely as a pendulum, it should have at the center, in the interior of the shell, a brace holding the exterior ring (outer race) of a ballbearing, allowing the interior ring (the inner race) to be freewheeling. The front shell has a weight at the bottom whose function is to make the device stay plumb. The weight could be set in a threaded spindle that allows for calibration by rotating it, and a set screw to anchor it. The interior ring could have a cap on each side that is perforated in the center so it does not interfere with the holding screw, but allows the option of holding the device against a wall with one finger pressing the front cap, and the rear cap facilitates attaching a thicker extension that allows for a better contact to the wall or vertical surface. The exterior ballbearing cap could have in its front face a conical recess for the screw to self-center as it secures the unit to the wall.

The rear shell should be aligned and balanced, so it does not affect or hinder the dynamics of the front plate, allowing the device to always be plumb.

The rear shell will house all the electrical components and its connections, including the power source, the on/off switch and the two light beams located at the rear edge, closest to the wall, and at the extremes of the axis focusing the light beams in opposite directions. The rear shell should also have a corresponding hole, or another rotating system at the center of the shell, to allow the front shell's extension of the ballbearing to contact the wall or vertical surface without hindering the pendulum function.

The shells could be coupled in a way that keeps them attached, but allows them to rotate in relation to each other, to allow dialing and then projecting the desired angle. The rear shell has a reference line, the front shell has graduated lines that when rotated and aligned indicate the angle dialed, up to 360°.

The special screw has a blind hole drilled into the core of its drive to allow the special pin to be inserted and removed as needed.

The compact self-leveling laser level can be utilized by positioning the device at the selected location in the wall or vertical surface, pushing the center cap with one finger; or by inserting a pin through the center of the cap; or by screwing the unit to the wall; or by using the special screw to secure the device to the wall, inserting the special pin, and using it as a nail grab to hold the tip of the measuring tape, allowing the user to accurately and without any assistance measure distances from the initial point (the origin of the axis) beyond arm's reach.

The disclosed device functions in a unique way when compared with other known devices and solutions because it provides: (1) A sturdier and more reliable pendulum action because the entire front shell is actually a pendulum; (2) The device is much smaller, small enough to fit in your pocket, making it more convenient; (3) The present invention allows the user to dial and project any angle, 180×2=360; (4) The device is self-leveling; and (5) The present invention can project two light beams away from the origin of the axis simultaneously. Similarly, the disclosed method is unique when compared with other known processes and solutions in that it: (1) it's easier to use; (2) allows the option of dialing and projecting any angle; and (3) it does not require an assistant to measure and mark the desired points beyond arm's reach.

The disclosed device is unique in that it is structurally different from other known devices or solutions. More specifically, the device is unique due to the presence of (1) The ballbearing allows the entire device to rotate smoothly improving the pendulum action, and making it more reliable and accurate; (2) The ballbearing at the center of the device gives it greater versatility in dialing the angles; (3) The ballbearing is stronger and can be secured with a screw; (4) The ballbearing has a conical recess that allows the holding screw to self-center; (5) The device has a simpler design with less moving parts making it sturdier and most likely less expensive to manufacture; (6) The pendulum can be calibrated if needed; (7) The unit is much smaller, making it more convenient to carry and store. Furthermore, the process associated with the aforementioned device is likewise unique. More specifically, the disclosed process owes its uniqueness to the fact that (1) The present invention allows the user to quickly select and project any angle on a vertical surface; (2) The user can select to hold the device with a finger or a pin, or screw the device with a regular screw or the special screw and pin provided, that allows the user to measure distances beyond arm's reach along the light beam lines without the help of an assistant; (3) The device is self-leveling.

The suggested form of performing the method associated with the disclosed self leveling laser level consists of the following steps: Find the desired angle at the rear edge of the front shell, rotate the rear shell until the selected angle is aligned with the guide mark located near the front edge of the rear shell, position the center hole at the desired initial point on a wall or vertical surface, press with one finger the front cap, or use a pin or screw the device through the hole in the center of the ballbearing, turn unit on and utilize the projected level line light beam(s) as desired. If using the measuring option, use the special screw to secure the unit, insert special pin, latch the nail grab of the measuring tape to the head of the special pin, measure and mark the desired points along the light beam line.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The present device may, however, be embodied in many different forms and should not be construed as being limited to the embodiments set forth herein; rather, these embodiments are provided by way of illustration only, many modifications, variations and other embodiments will come to mind of those skilled in the art, and which are intended to be and are in fact covered by this disclosure.

Figure 1:
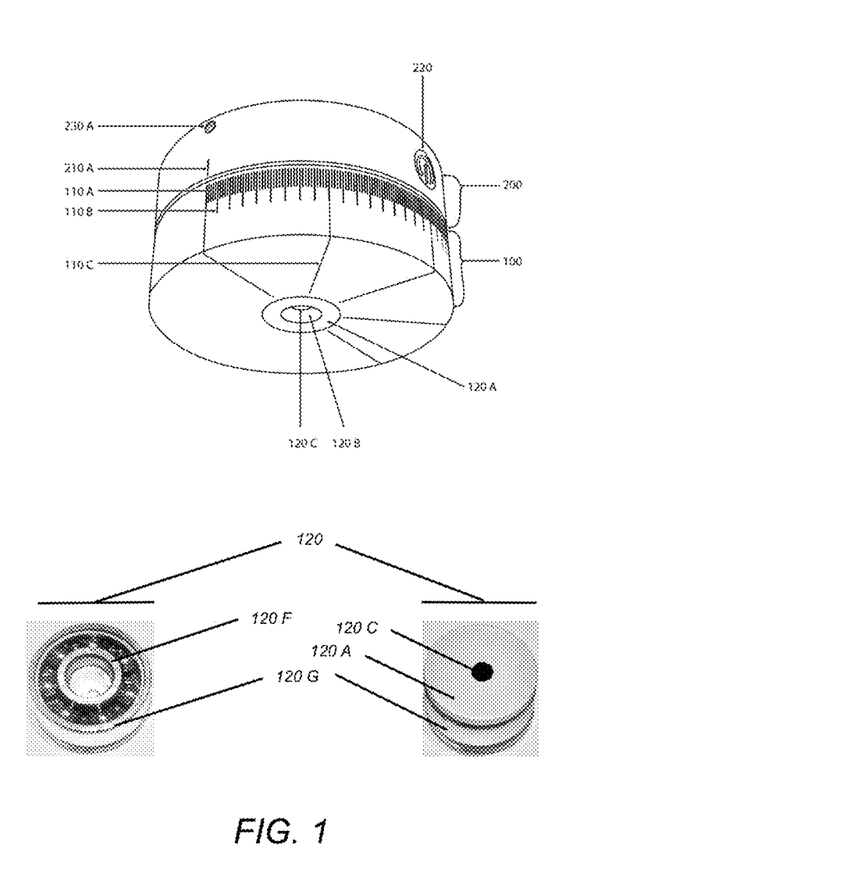
FIG. 1. Shows a perspective view of the self-leveling laser level in accordance with the present invention, and two views of the ballbearing.

FIG. 1
100—Front Shell
200—Rear Shell
220—On/Off Switch
110 A—Fine Graduation (180×2=360 Degrees)
110 B—5 Degree Increment Graduation
110 C—45 Degree Increment Graduation
120—Ballbearing
120 A—Ballbearing Cap
120 B—Conical Recess on the Cap of the Ballbearing for the Holding Screw to Self Center
120 C—Hole for Holding Screw
120 F—Ballbearing's Interior Ring (inner race)
120 G—Ballbearing's Exterior Ring (outer race)
210 A—Angle Reference Guide
230 A—Light Beam (laser beam)

FIG. 1 shows the perspective view of the self-leveling light line generating device according to an embodiment of this invention. The case is a disk, about one inch thick and about three inches in diameter, that is formed by two shells. FIG. 1 also shows two views of a detached ballbearing 120, one has the ballbearings exposed and the other one has the ballbearing cap 120 A.

The entire device acts as a pendulum rotating in its axis when it is attached to a wall or vertical surface facilitated by the ballbearing 120 located in the center, and attached to the front shell 100 by a ballbearing brace 121 A, that holds the ballbearing's exterior ring 120 G. The rear shell 200 has all the electronics to project two light beams 230A (and 230B, not shown) in opposite directions to form a level line, or if desired any angle relative to the level line.

The rear shell 200 has to be balanced and aligned so it doesn't affect or hinder the dynamics of the front plate 100, allowing it to stay plumb.

It should further be noted that: the case and the ballbearing may be made of any material, including metal, aluminum, ceramic, or hard impact resistant man-made materials.

FIG. 1 shows the light line generating device case in the form of a disk, but could be made as a cuboid or any other geometric shape, the case is formed by two plates or shells that are coupled in a way that allows for the front shell 100 and the rear shell 200 to rotate from each other to dial any desired angle, assisted by aligning the Angle Guide 210A, with the graduations marking the angles 110A, 110B, 110C, but then allows the front shell 100 and the rear shell 200 to stay attached at the desired angle to project a line emitted from two light beams 230A, (and 230B, not shown) through the covered lens or uncovered apertures on opposite directions along the axis of the present invention. The light beams could have a lens, window or mechanism that allows them to project a dot, a continuous light line, or any other light beam configuration, either permanently or selected, these options are not shown.

The device could be made to display the selected angle in a digital format.

The present invention may include one on/off switch 220, but could have more than one switch, and can also be operated with a wireless switch, not shown.

In the center of the front disk or shell 100 the present invention has a ballbearing or a rotating mechanism 120 that allows the rest of the housing to rotate freely along its axis, the ballbearing has a hole 120C with a conical recess 120 B on the cap 120 A of the ballbearing 120 for the holding screw to self-center.

Figure 2:
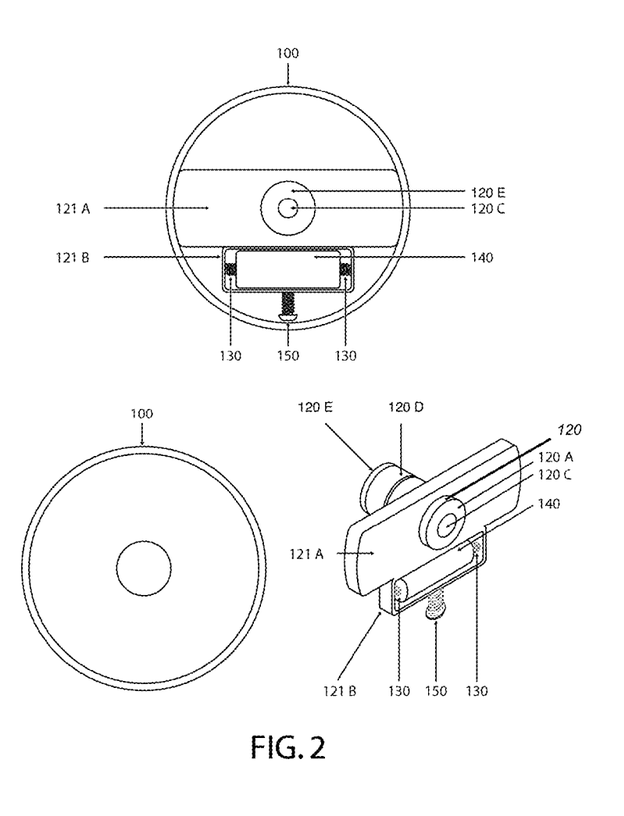
FIG. 2. Shows the interior view of the front shell with components.

FIG. 2
100—Front shell Interior View
120—Ballbearing
120 A—Ballbearing Cap
120 C—Hole for Holding Screw
120 D—Ballbearing Extension
120 E—Ballbearing Extension Non Slip Surface
121 A—Ballbearing Brace 121 B—Calibration Housing
130—Threaded Weight Spindle
140—Weight
150—Weight Calibration Set Screw FIG. 2 shows the interior view of the front shell 100 and its detached components. It shows the ballbearing 120, the hole for the holding screw 120C, the extension 120D, and the non-slip surface 120 E of the extension of the ballbearing. (The entire extension 120D could also be made to be non-slip.) The ballbearing 120 is secured to the ballbearing brace 121A by the exterior ring 120 G (outer race), allowing the interior ring 120 F (inner race), to be free wheeling, the ballbearing brace 121 A is attached to the front shell 100. The ballbearing brace 121A could include or have attached a calibration housing 121B, that would have a calibration weight 140 centered in a threaded spindle 130 and a calibration set screw 150 to anchor the weight and prevent non-intentional movement.

Figure 3:
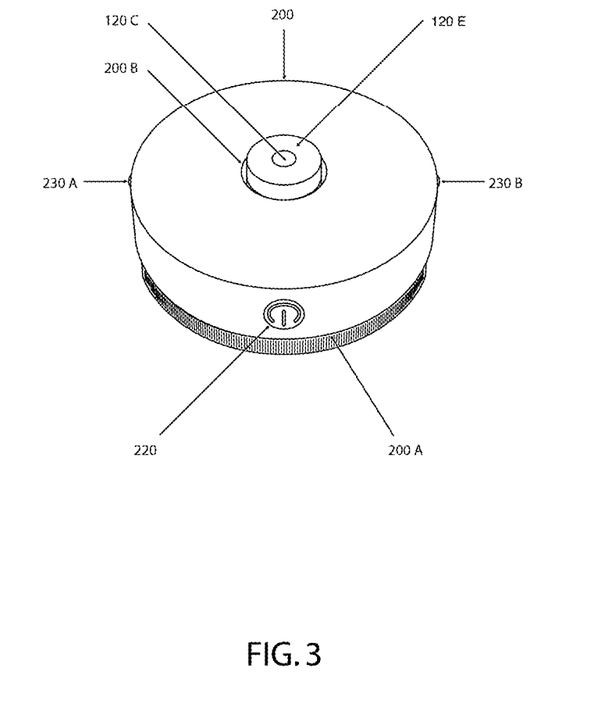
FIG. 3. Shows the exterior view of the rear shell.

FIG. 3
120 C—Exit Hole for Holding Screw
120 E—Ballbearing Extension Non Slip Surface
200—Rear Housing Exterior View
200 A—Coupling Area for the Front and the Rear Housing to Rotate
200 B—Space or Mechanism to allow Ballbearing to Rotate without any friction to the rear shell.
220—On/Off Switch
230 A—Light Beam
230 B—Light Beam FIG. 3 shows the exterior view of the rear shell 200, 120C is the exit hole for the holding screw, 120E is the non-slip surface of the ballbearing extension 120D that will make contact with the vertical surface or wall. 200A is the coupling area for the front housing 100, and the rear housing 200 to stay attached but allow them to rotate when dialing the desired angle, it could also have a set screw or mechanism to separate the front 100 and rear shell 200 when required. 200B is the space or mechanism that allows the ballbearing 120 that is attached to the front shell 100 to rotate freely without any interference or friction from the rear shell 200. The on/off switch 220 controls the two light beams 230A & 230B presented in this invention, but it could have any number of light beams.

Figure 4:
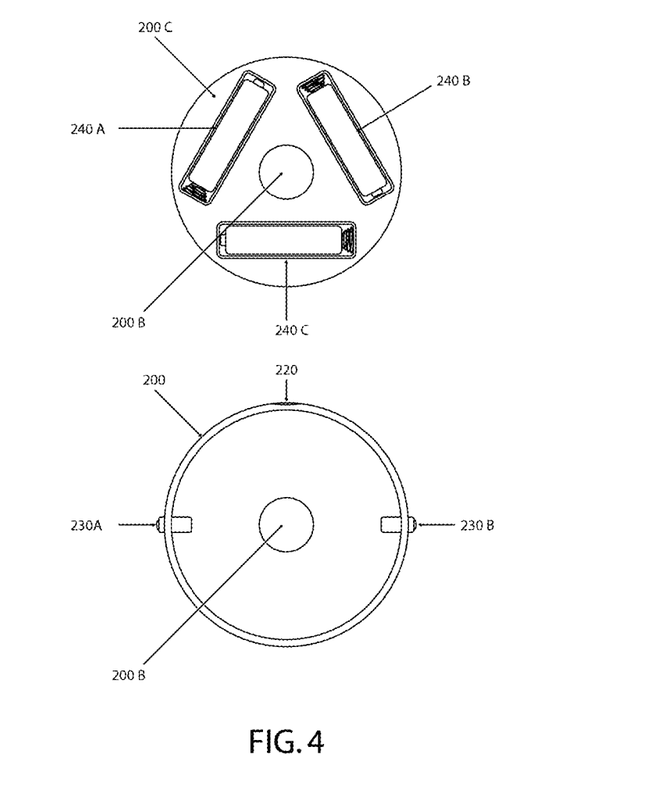
FIG. 4. Shows the interior view of the rear shell with components.

FIG. 4
200—Rear Housing Interior View
200 B—Space or Mechanism to allow Ballbearing to Rotate Freely
200 C—Power Source Housing
220—On/Off Switch
230 A—Light Beam
230 B—Light Beam
240 A—Power Source
240 B—Power Source
240 C—Power Source FIG. 4 shows the interior view of the rear housing 200. The device has a hole or space 200B that allows the ballbearing 120, the ballbearing extension 120D and the non-slip surface 120E of the ballbearing extension to pass through the rear shell 200 to make contact with the vertical surface or wall, it could also have another ballbearing or mechanism that avoids any friction between them, not shown. 200C is the platform or housing for the power source. 220 is the on/off switch. 230A & 230B are the light beams. 240A, 240B & 240C are the light sources. The light sources could be thinner or smaller to make the device even smaller, not shown.

The rear shell 200 has to be balanced and aligned so it does not affect or interfere with the dynamics of the front shell 100, allowing it to stay plumb.

Figure 5:
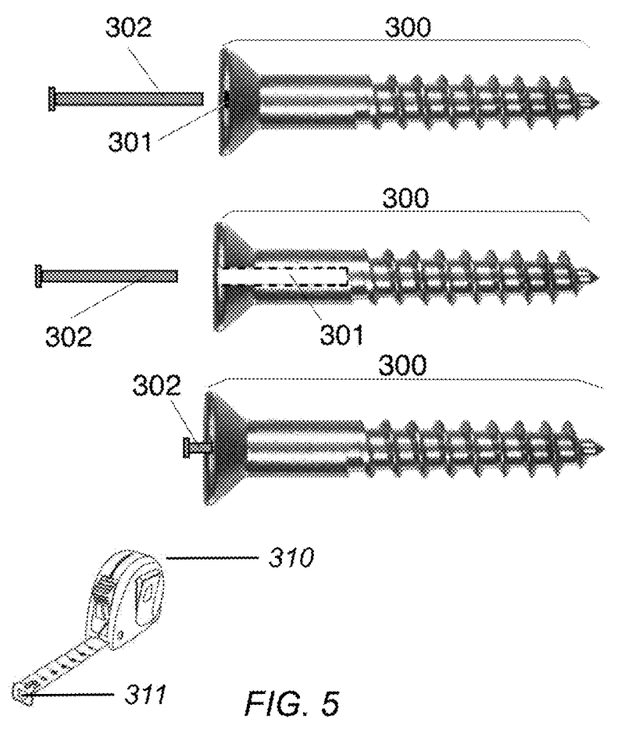
FIG. 5. Shows the special screw, the special pin; a measuring tape and its nail grab.

FIG. 5
300 Special screw
301 Blind Hole in Special Screw
302 Special Pin
310 Measuring Tape
311 Measuring tape's Nail Grab FIG. 5 shows the Special Screw 300 with its core drilled to create a blind hole 301, that accepts the special pin 302, that is intended to be used when the user desires to measure distances beyond arm's reach along the light beam lines without the help of an assistant. To use this option the user will use the special screw 300 to secure the device to the wall, insert the special pin 302 in the blind hole 301 of the special screw 300, turn on the device 220, take the measuring tape 310, engage the measuring tape's nail grab 311 in the special pin 302 and measure the desired distance(s) along the light beams.

The special screw could have any type of head, including Phillips, Flat, Hex, double Hex, Torx, Robertson or any other kind of screw drive. The special pin could be any type of pin, nail or screw.

EXEMPLARY EMBODIMENTS OF THE INVENTION

The invention may be embodied in various ways, for example, as follows.

In one embodiment the invention encompasses a self-leveling laser level device. In some embodiments the device may employ a non-laser light, such as a normal LED light. The device may comprise a round housing (in some embodiments it may not be round—it can be square, rectangular, triangular or any other shape, so long as it works) containing working components, the housing having a front shell (alternatively called 'front housing') and a back shell (alternatively called 'back housing') adapted to fit together (fitted for example by clip, screw, press-fit) defining a cavity (a void, a hollow volume) to contain the working components, wherein both the front shell and the back shell defines a circumference (i.e. it's round in shape, though it could be any shape) and has an inner surface and an outer surface, and is shaped approximately in the form of a tube (but could be any shape so long as it works for its intended purpose), substantially closed at one end by a disc-shaped face.

Note that 'substantially closed' is to be broadly interpreted to cover any level of occlusion from 1% to 90% of the surface area, or 5% to 50% or 5% to 30% and generally in this instance, the end of the flattened tube will be about 50-90% closed by surface area—we can alternatively use the phrase 'partially closed'—basically we are describing a squat tube-shape, with a diameter greater than its depth, partially closed off at one end.

The disc-shaped face has a central hole therein, wherein both the front shell and the back shell each has a diameter and a depth wherein the diameter is larger than the depth. The hole may be quite small, such as the size necessary to fit a pin or a screw through. The function of the hole is only to allow the device to be secured to a wall, so any suitable size may be used for the hole. The front shell comprises, immovably fixed to the inner surface of its disc-shaped face, a brace (a ring, a washer, a bar, a form, a clamp) holding a circular ball bearing (or any other means allowing easy rotation about an axis, such as an axel, pin, or a wheel) positioned approximately at the center of the inner surface of the disc-shaped face.

The brace (if there is a brace) holding the circular ball bearing may be of any shape, and indeed in some embodiments, there may be no brace at all, but the ballbearing may simply be glued or otherwise fixed to the inside surface of the front shell such that one of the races is fixed and the races may move relative to the each other allowing the front shell to rotate relative to the back shell. So, we could define the glue adhesive as the brace.

The ball bearing comprises an outer race and an inner race with balls set therebetween, allowing the inner race and the other race to rotate freely about each other (note that either the inner race or the other race or neither race may be held static and the other or both may move) along the axis of the device, wherein the ballbearing further comprises a central hole (there is a hole through the middle of the ball bearing) adapted to receive a holding screw or pin (i.e. the hole is designed to receive a screw, so it may be threaded).

The ballbearing may have affixed thereto a ballbearing extension (this is just a piece that extends from the bearing structure and projects through the back of the housing—or in other embodiments through the front of the housing—the position is irrelevant to the function of the device).

Optionally affixed to the ballbearing extension may be a non-slip surface (the whole extension may be non-slip, such as a rubberized polymer), adapted such that in use, the non-slip surface projects beyond the outer surface of the back shell such that it may removably contact a surface.

A calibration housing (this housing just holds a weight to act as a plumb-line) may be attached to the brace or attached to a (any) fixed location on the inside of the front shell (front housing), the calibration housing comprising a calibration weight. This weight may be centered in a threaded spindle (it may not be threaded—it could just be any weight placed within the housing, or simply attached to the brace or equivalent, or even affixed to the inner surface of the housing such as the front shell—just so it acts as a plumb weight to act as a pendulum to carry out the invention) either moveable or not. A calibration set screw may be provided but is optional and need not be present in various embodiments, and is adapted to securely fix the position of the calibration weight within the calibration housing, whereby, in use, the calibration weight acts as a pendulum causing the brace to rotate about the axis of the device and coming to rest at a lowest point of an arc of rotation.

The back shell houses a power source functionally connected to a switch operable from the exterior of the housing, said switch is functionally connected to two or more laser light sources, wherein at least two of said laser light sources are positioned diametrically opposite each other such that in use, each light source is able to project a light beam outwards from the device at 180 degrees to each other such that the beams extend along the same linear dimension giving the impression of a single straight line passing through the device. The front shell and the back shell are fitted together in such a way as to allow rotational movement relative to each other of at least 360 degrees, thereby facilitating positioning the beams of light at any desired angle relative to the device.

In one embodiment the invention encompasses self-leveling laser level device above wherein the power source comprises a battery.

In one embodiment the invention encompasses the self-leveling laser level device above wherein the holding screw is a square screw having a blind hole drilled into its core adapted to receive special pin that may be inserted and removed as needed.

In one embodiment the invention encompasses the self-leveling laser level device above wherein the housing is made from a material selected from the group consisting of a metal, a ceramic and a plastic.

In another embodiment the invention encompasses the self-leveling laser level device above wherein the calibration housing is attached to the brace.

In another embodiment the invention encompasses the self-leveling laser level device above wherein the calibration housing is attached to the to a fixed location on the inside of the front shell.

In another embodiment the invention encompasses the self-leveling laser level device above wherein the calibration housing comprises a calibration weight centered in a threaded spindle.

In a different embodiment the invention encompasses the self-leveling laser level device above wherein the calibration housing comprises a calibration weight centered in a threaded spindle and a calibration set screw adapted to securely fix the position of the calibration weight within the calibration housing.

In a different embodiment the invention encompasses the self-leveling laser level device above wherein and wherein the ballbearing extension has affixed thereto a non-slip surface.

In another embodiment the invention encompasses the self-leveling laser level device above wherein the power source comprises a battery.

In another embodiment the invention encompasses the self-leveling laser level device above wherein the holding screw is a square screw having a blind hole drilled into its core adapted to receive special pin that may be inserted and removed as needed.

In another embodiment the invention encompasses the self-leveling laser level device above wherein the housing is made from a material selected from the group consisting of a metal, a ceramic and a plastic.

In a further embodiment the invention encompasses the self-leveling laser level device above wherein marks are provided on the outer surfaces of the front shell and the back shell, which marks indicate a relative angle when the front shell and the back shell are moved relative to each other.

In a further embodiment the invention encompasses the self-leveling laser level device above comprising a second ballbearing fitted to the ballbearing extension or the non-slip surface ballbearing extension.

In a further embodiment the invention encompasses the self-leveling laser level device above wherein the brace is disc-shaped.

In a further embodiment the invention encompasses the self-leveling laser level device above wherein the brace is bar-shaped.

In a further embodiment the invention encompasses the self-leveling laser level device above wherein the inner race is fixed in place and the outer race moves.

In a further embodiment the invention encompasses the self-leveling laser level device above comprising two laser light sources set at 180 degrees to each other.

In a further embodiment the invention encompasses the self-leveling laser level device above comprising three laser light sources.

In a further embodiment the invention encompasses the self-leveling laser level device above comprising four laser light sources each set at 90 degrees to each other.

In a further embodiment the invention encompasses the self-leveling laser level device above wherein the outer race is fixed in place and the inner race moves.

A different embodiment is a method for identifying and marking locations on an approximately vertical surface, comprising the steps of:

(a) providing a self-leveling laser level device comprising: a round housing containing working components, the housing having a front shell and a back shell adapted to fit together defining a cavity to contain the working components, wherein both the front shell and the back shell has an inner surface and an outer surface, and is shaped approximately in the form of a short tube, substantially closed at one end by a disc-shaped face, said disc-shaped face having a central hole therein, wherein both the front shell and the back shell each has a diameter and a depth wherein the diameter is larger than the depth;

wherein the front shell comprises, immovably fixed to the inner surface of its disc-shaped face, a brace holding a circular ball bearing positioned approximately at the center of the inner surface of the disc-shaped face, wherein the ball bearing comprises an outer race and an inner race with balls set therebetween, allowing the inner race and the other race to rotate freely about each other along the axis of the device, wherein the ballbearing further has within it a central hole adapted to receive a holding screw, and wherein the ballbearing has affixed thereto a ballbearing extension, adapted such that in use, the ballbearing extension projects through the central hole of the back shell and beyond the outer surface of the back shell such that in use it may removably contact a vertical surface;

wherein, a calibration housing is attached to the brace or to a fixed location on the inside of the front shell, the calibration housing comprising a calibration weight whereby, in use, the calibration weight acts as a pendulum causing the front shell to rotate about the axis of the device and coming to rest at a lowest point of an arc of rotation;

wherein the back shell houses a power source functionally connected to a switch operable from the exterior of the housing, said switch is functionally connected to two or more laser light sources, wherein at least two of said laser light sources are positioned diametrically opposite each other such that in use, each light source is able to project a light beam outwards from the device at 180 degrees to each other such that the beams extend along the same linear dimension giving the impression of a single straight line passing through the device;

further, wherein the front shell and the back shell are fitted together in such a way as to allow rotational movement relative to each other of at least 360 degrees, thereby facilitating positioning the beams of light at any desired angle relative to the device;

and further, in any order:

(b) selecting a desired angle;

(c) rotating the front shell relative to the back shell until the desired angle indicated;

(d) removably fixing the device to the vertical surface;

(e) turning on the device on to activate the light beams; and (f) and marking desired points on the vertical surface as indicate by the light beam.

The above method of claim may be done wherein the self-leveling laser level device is removably fixed to the vertical surface at a selected point by pressing upon the center device with a finger to hold the self-leveling laser level device against the vertical surface.

The general embodiment of the invention disclosed herein discloses a device with two laser lights, positioned diametrically opposite each other on the device such that in use, each light source is able to project a light beam outward from the device at 180 degrees from the other, such that the beams extend along the same linear dimension giving the impression of a single straight line passing through the device. In an alternative embodiment the device of the invention may comprise a single laser light split into two beams by a prism or mirror or system of mirrors to provide the same effect. In one alternative embodiment the laser is aimed at a mirror and the mirror is mounted on a motor so that it rotates at a speed that directs the beam in first one direction and then another, such that it produces the illusion of a single straight beam of laser light projection from the device extending along the same linear dimension.

In another embodiment the invention employs a device with three or more laser beams extending from the device. This may be produced by one laser light source or more, employing a splitting mirror or prism. Or it may employ three or more laser light sources, each capable or projecting a bean in a different direction. Such an embodiment allows the device to illuminate three or more desired locations set at various angles, such as at 90 degrees from one another. So, in one example the device could be used to indicate locations in a T-shape or a cross shape with 90 degrees between each line. Any variation in arc is possible and permissible in the present invention.

References: The following references may be useful as background information and are hereby incorporated by reference: WO2010108719 and US patents/applications U.S. Pat. Nos. 7,073,269, 6,028,665, 7,155,835, 7,591,075, 6,829,834, D500,734, D942,875, D942,874, 11,175,136, D934,707, D931,125, 11,125,877, 11,002,542, 10,982,958, 10,712,154, 10,598,490, 10,508,916, 10,466,049, 10,363, 614, 10,119,817, 10,066,939 and 10,006,768.

General disclosures: All references and publications disclosed herein are hereby incorporated by reference for all purposes. In this specification, reference is made to particular features of the invention. It is to be understood that the disclosure of the invention in this specification includes all appropriate combinations of such particular features. For example, where a particular feature is disclosed in the context of a particular embodiment or a particular claim, that feature can also be used, to the extent appropriate, in the context of other particular embodiments and claims, and in the invention generally. The embodiments disclosed in this specification are exemplary and do not limit the invention. Other embodiments can be utilized and changes can be made. As used in this specification, the singular forms "a", "an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. Where reference is made in this specification to a method comprising two or more defined steps, the defined steps can be carried out in any order or simultaneously, and the method can optionally include one or more other steps which are carried out before any of the defined steps, between two of the defined steps, or after all the defined steps. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility).

The invention claimed is:

1. A self-leveling laser level device comprising:
    a round housing containing working components, the housing having a front shell and a back shell adapted to fit together defining a cavity to contain the working components, wherein both the front shell and the back shell has an inner surface and an outer surface, and is shaped approximately in the form of a short tube, substantially closed at one end by a disc-shaped face, said disc-shaped face having a central hole therein, wherein both the front shell and the back shell each has a diameter and a depth wherein the diameter is larger than the depth;
    wherein the front shell comprises, immovably fixed to the inner surface of its disc-shaped face, a brace holding a circular ball bearing positioned approximately at the center of the inner surface of the disc-shaped face, wherein the ball bearing comprises an outer race and an inner race with balls set therebetween, allowing the inner race and the other race to rotate freely about each other along the axis of the device, wherein the ballbearing further has within it a central hole adapted to receive a holding screw,
    and wherein the ballbearing has affixed thereto a ballbearing extension, adapted such that in use, the ballbearing extension projects through the central hole of the back shell and beyond the outer surface of the back shell such that in use it may removably contact a vertical surface;
    wherein, a calibration housing is attached to the brace or to a fixed location on the inside of the front shell, the calibration housing comprising a calibration weight whereby, in use, the calibration weight acts as a pendulum causing the front shell to rotate about the axis of the device and coming to rest at a lowest point of an arc of rotation;
    wherein the back shell houses a power source functionally connected to a switch operable from the exterior of the housing, said switch is functionally connected to two or more laser light sources, wherein at least two of said laser light sources are positioned diametrically opposite each other such that in use, each light source is able to project a light beam outwards from the device at 180 degrees to each other such that the beams extend along the same linear dimension giving the impression of a single straight line passing through the device;
    further, wherein the front shell and the back shell are fitted together in such a way as to allow rotational movement relative to each other of at least 360 degrees, thereby facilitating positioning the beams of light at any desired angle relative to the device.

2. The self-leveling laser level device of claim 1 wherein the calibration housing is attached to the brace.

3. The self-leveling laser level device of claim 1 wherein the calibration housing is attached to the to a fixed location on the inside of the front shell.

4. The self-leveling laser level device of claim 1 wherein the calibration housing comprises a calibration weight centered in a threaded spindle.

5. The self-leveling laser level device of claim 1 wherein the calibration housing comprises a calibration weight centered in a threaded spindle and a calibration set screw adapted to securely fix the position of the calibration weight within the calibration housing.

6. The self-leveling laser level device of claim 1 wherein and wherein the ballbearing extension has affixed thereto a non-slip surface.

7. The self-leveling laser level device of claim 1 wherein the power source comprises a battery.

8. The self-leveling laser level device of claim 1 wherein the holding screw is a square screw having a blind hole drilled into its core adapted to receive special pin that may be inserted and removed as needed.

9. The self-leveling laser level device of claim 1 wherein the housing is made from a material selected from the group consisting of a metal, a ceramic and a plastic.

10. The self-leveling laser level device of claim 1 wherein marks are provided on the outer surfaces of the front shell and the back shell, which marks indicate a relative angle when the front shell and the back shell are moved relative to each other.

11. The self-leveling laser level device of claim 1 comprising a second ballbearing fitted to the ballbearing extension or the non-slip surface ballbearing extension.

12. The self-leveling laser level device of claim 1 wherein the brace is disc-shaped.

13. The self-leveling laser level device of claim 1 wherein the brace is bar-shaped.

14. The self-leveling laser level device of claim 1 wherein the inner race is fixed in place and the outer race moves.

15. The self-leveling laser level device of claim 1 comprising two laser light sources set at 180 degrees to each other.

16. The self-leveling laser level device of claim 1 comprising three laser light sources.

17. The self-leveling laser level device of claim 1 comprising four laser light sources each set at 90 degrees to each other.

18. The self-leveling laser level device of claim 1 wherein the outer race is fixed in place and the inner race moves.

19. A method for identifying and marking locations on an approximately vertical surface, comprising the steps of:
    (a) providing a self-leveling laser level device comprising: a round housing containing working components, the housing having a front shell and a back shell adapted to fit together defining a cavity to contain the working components, wherein both the front shell and the back shell has an inner surface and an outer surface, and is shaped approximately in the form of a short tube, substantially closed at one end by a disc-shaped face, said disc-shaped face having a central hole therein, wherein both the front shell and the back shell each has a diameter and a depth wherein the diameter is larger than the depth;

wherein the front shell comprises, immovably fixed to the inner surface of its disc-shaped face, a brace holding a circular ball bearing positioned approximately at the center of the inner surface of the disc-shaped face, wherein the ball bearing comprises an outer race and an inner race with balls set therebetween, allowing the inner race and the other race to rotate freely about each other along the axis of the device, wherein the ball-bearing further has within it a central hole adapted to receive a holding screw, and wherein the ballbearing has affixed thereto a ballbearing extension, adapted such that in use, the ballbearing extension projects through the central hole of the back shell and beyond the outer surface of the back shell such that in use it may removably contact a vertical surface;

wherein, a calibration housing is attached to the brace or to a fixed location on the inside of the front shell, the calibration housing comprising a calibration weight whereby, in use, the calibration weight acts as a pendulum causing the front shell to rotate about the axis of the device and coming to rest at a lowest point of an arc of rotation;

wherein the back shell houses a power source functionally connected to a switch operable from the exterior of the housing, said switch is functionally connected to two or more laser light sources, wherein at least two of said laser light sources are positioned diametrically opposite each other such that in use, each light source is able to project a light beam outwards from the device at 180 degrees to each other such that the beams extend along the same linear dimension giving the impression of a single straight line passing through the device;

further, wherein the front shell and the back shell are fitted together in such a way as to allow rotational movement relative to each other of at least 360 degrees, thereby facilitating positioning the beams of light at any desired angle relative to the device;

and further, in any order:
(b) selecting a desired angle;
(c) rotating the front shell relative to the back shell until the desired angle indicated;
(d) removably fixing the device to the vertical surface;
(e) turning on the device on to activate the light beams; and
(f) and marking desired points on the vertical surface as indicate by the light beam.

20. The method of claim 19 wherein the self-leveling laser level device is removably fixed to the vertical surface at a selected point by pressing upon the center device with a finger to hold the self-leveling laser level device against the vertical surface.

* * * * *